(No Model.)
B. THOENS.
GAS VALVE FOR ICE MACHINES.
No. 289,727. Patented Dec. 4, 1883.
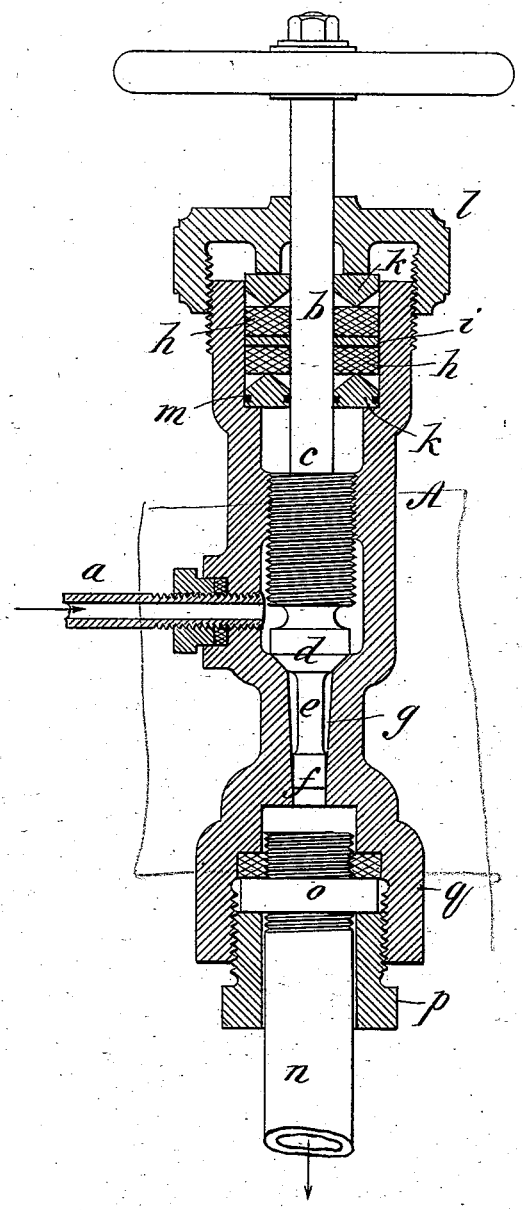
Witnesses:
C. Sedgwick
Alfred H. Davis
Inventor:
B. Thoens
By Munn & Co.
Attorneys

United States Patent Office.

BURCHARD THOENS, OF NEW ORLEANS, LOUISIANA, ASSIGNOR OF ONE-HALF TO MOSES SCHWARTZ, OF SAME PLACE.

GAS-VALVE FOR ICE-MACHINES.

SPECIFICATION forming part of Letters Patent No. 289,727, dated December 4, 1883.

Application filed July 2, 1883. (No model.)

*To all whom it may concern:*

Be it known that I, BURCHARD THOENS, of New Orleans, in the parish of Orleans and State of Louisiana, have invented a new and useful Improvement in Gas-Valves for Ice-Machines, of which the following is a full, clear, and exact description.

My invention consists in a valve constructed for minute regulation of the flow of gas, it being especially intended for use in connection with ice-machines in which ammonia-gas is used.

Reference is to be had to the accompanying drawing, forming a part of this specification, in which my improved valve is shown by longitudinal section.

A is the body of the valve, having an inlet-pipe attached at $a$. $b$ is the stem, formed with a screw-cylinder, $c$, that engages a thread on the interior of the valve-body; and $d$ is the valve proper, closing upon a seat formed in the valve-body. The valve may be ground to its seat, or it may be coated with tin or other soft metal. On the outer end of the valve $d$ is formed a stem, $e$, that terminates in a cylindrical portion, $f$, which is within a slightly-tapered passage, $g$, formed in the valve-body between the outlet and the seat of the valve $d$. By the movement of the valve-stem up and down, the cylindrical portion $f$ is moved in the passage $g$, and the space between the cylinder $f$ and the sides of the passage is widened or increased, according to the distance that the valve $d$ is opened, thus allowing a greater or less flow of gas and the most minute regulation, as may be required. The valve-stem $b$ is packed by rubber washers $h$ $h$, between which is a metal washer, $i$, and these washers are clamped between metal rings $k$ $k$, which are beveled upon their surfaces next to the washers. By screwing down the cap $l$, the two rubber washers $h$ are clamped between the rings $k$ $k$, and thus spread, so as to close tightly against the stem and the inner surface of the valve-body. This expansion is increased by the pressure upon the interior of the valve acting upon the inner ring, $k$, which may be provided with packings $m$, to insure its movement under pressure of gas. This packing may be applied to valve stems or rods wherever required.

The outlet-pipe $n$ is provided with an adjustable ring or collar, $o$, which is clamped by a screw-ring, $p$, fitted in the socket $q$, formed in the outlet end of the valve-body. This makes a convenient connection, which does not require the pipe to be cut off to an accurate length, as is the case when the connection is made by flanges. By adjustment of the collar $o$ and of the ring $p$ considerable variation in the length of the pipe can be allowed for.

I am aware that a conical valve at the end of a screw, a cap screwing on a valve-case, and a chamber containing packing around the stem are not new; but What I do claim as new and of my invention is—

1. The combination of the case A, having the conical hole or passage $g$ below the valve-seat, and the extension $e$, with cylindrical lower end or head, $f$, said extension projecting from the bottom of an adjustable valve, $d$, as and for the purpose described.

2. The combination, with case A, having a screw-cap thereon and packing-rings therein, of the beveled top and bottom metallic rings, $k$ $k$, the top ring $k$ being pressed by downward projections on the bottom of cap, as and for the purpose set forth.

3. The combination, with a top-threaded outlet-pipe, $n$, case A, having internally-threaded end $q$, and the screw-ring $p$, of an internally-threaded collar, $o$, adapted to screw upon the pipe, as and for the purpose specified.

BURCHARD THOENS.

Witnesses:
 A. GORDES,
 J. BENDERNA.